(12) United States Patent
    Zhang

(10) Patent No.: US 7,969,050 B2
(45) Date of Patent: Jun. 28, 2011

(54) EXTERNAL ROTOR AND HOUSING THEREFOR

(75) Inventor: Xu Zhang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 0 days.

(21) Appl. No.: 12/471,465

(22) Filed: May 25, 2009

(65) Prior Publication Data

US 2010/0133932 A1    Jun. 3, 2010

(30) Foreign Application Priority Data

Dec. 3, 2008    (CN) .......................... 2008 1 0219779

(51) Int. Cl.
    *H02K 9/00*    (2006.01)
(52) U.S. Cl. .......................... 310/61; 310/62; 310/60 A
(58) Field of Classification Search .................. 310/59, 310/61–63, 60 A
    See application file for complete search history.

(56) References Cited

U.S. PATENT DOCUMENTS

| 5,040,285 | A  | * | 8/1991 | Williams et al. ................. 29/596 |
| 5,778,703 | A  | * | 7/1998 | Imai et al. ..................... 68/12.02 |
| 6,396,177 | B1 | * | 5/2002 | Shin et al. ....................... 310/63 |
| 7,015,606 | B2 | * | 3/2006 | Huang et al. .................... 310/63 |

* cited by examiner

*Primary Examiner* — Dang D Le
(74) *Attorney, Agent, or Firm* — Matthias Scholl P.C.; Matthias Scholl

(57) ABSTRACT

A housing for an external rotor with a side wall; an end cover directly connected to the side wall; a cavity formed between the side wall and the end cover; a plurality of openings formed in the side wall; a plurality of wind wheels; a plurality of air inlets, each of the air inlets disposed one between adjacent wind wheels; a base disposed at the center of the end cover and connected to the side wall via the wind wheels; and a center hole disposed at the center of the base, the center hole for forming connection to a drive shaft of the external rotor. An external rotor with the housing, a magnetic conductive housing; and a plurality of magnetic tiles.

16 Claims, 5 Drawing Sheets

EXTERNAL ROTOR AND HOUSING THEREFOR

CROSS-REFERENCE TO RELATED APPLICATIONS

Pursuant to 35 U.S.C. §119 and the Paris Convention Treaty, this application claims the benefit of Chinese Patent Application No. 200810219779.0 filed on Dec. 3, 2008, the contents of which are incorporated herein by reference.

BACKGROUND OF THE INVENTION

1. Field of the Invention

The invention relates to a rotor and to housing for same.

2. Description of the Related Art

Elements of conventional housing for an external rotor, e.g., for a direct current motor, include: a side wall, an end cover, a cavity, an opening, a magnetic conductive housing, and a magnetic tile. Generally, the end cover is disposed at the bottom of the side wall; the cavity is formed between the side wall and the end cover; the magnetic conductive housing is disposed on the side wall; and the magnetic tile is disposed on the inner wall of the magnetic conductive housing.

However, some of the problems encountered with external rotors with conventional housings are that they are heavy, expensive and energy consuming, feature poor heat dissipation performance, and can dissipate heat only when rotating in one direction.

SUMMARY OF THE INVENTION

In view of the above-described problems, it is an objective of the invention to provide a housing that is light, cost-effective and energy saving, features good heat dissipation performance, and can dissipate heat when rotating both in the forward direction and in the reverse direction.

It is another objective of the invention to provide an external rotor that is light, cost-effective and energy saving, features a simple production process and good heat dissipation performance, and can dissipate heat when rotating in the forward direction and the reverse direction.

To achieve the above objectives, in accordance with one aspect of the present invention, there is provided a housing for an external rotor, comprising a side wall, an end cover, a cavity, an opening, a base, a center hole, multiple wind wheels and multiple air inlets, wherein the end cover is disposed at the bottom of the side wall, the cavity is formed between the side wall and the end cover, the opening is disposed at the top of the housing, the base is disposed at the center of the end cover and connected to the side wall via the wind wheels, the center hole is disposed at the center of the base and connected to a drive shaft of the external rotor, and the air inlet is disposed between adjacent wind wheels.

In certain classes of this embodiment, the thickness of the wind wheel (8) reduces gradually from the center thereof, so that axial airflow is generated as the housing rotates forwardly or reversely.

In certain classes of this embodiment, an annular step is disposed at the center of the side wall, multiple protruding parts extend from the surface of the annular step, a magnetic conductive housing is disposed on the annular step, a groove is disposed on one end of the magnetic conductive housing, and the protruding parts are received in the groove.

In certain classes of this embodiment, the center hole and the base are integrally formed by injection molding.

In certain classes of this embodiment, the housing further comprises a metal rotating spline connected to the base.

In certain classes of this embodiment, the center hole is disposed in the metal rotating spline, the metal rotating spline comprises multiple teeth, the teeth are arc-shaped, rectangular, triangular, involute, ladder-shaped or sawtooth-shaped, and the number of the teeth is between 2 and 60.

In certain classes of this embodiment, the housing further comprises a metal rotating spline disposed in the base.

In certain classes of this embodiment, the center hole is disposed in the metal rotating spline, the metal rotating spline comprises multiple teeth, the teeth are arc-shaped, rectangular, triangular, involute, ladder-shaped or sawtooth-shaped, and the number of the teeth is between 2 and 60.

In certain classes of this embodiment, the side wall, the wind wheel, and the base are integrally formed by injection molding.

In certain classes of this embodiment, each of the wind wheels is in a shape of an inverted V.

In certain classes of this embodiment, and the wind wheels are distributed circumferentially, and the number thereof is between 2 and 60.

In certain classes of this embodiment, multiple cross-shaped supporting ribs are disposed at the bottom of the wind wheel, and the wind wheels are connected to each other via multiple supporting ribs.

In certain classes of this embodiment, multiple axial supporting ribs and annular supporting ribs connected with each other are disposed at the top and the bottom of the base.

In accordance with another aspect of the present invention, there is provided an external rotor, comprising a magnetic conductive housing, a magnetic tile, and a housing, comprising a side wall, an end cover, a cavity, a base, and a center hole, wherein the magnetic tile is disposed on the inner wall of the magnetic conductive housing, the end cover is disposed at the bottom of the side wall, the cavity is formed between the side wall and the end cover, the base is disposed at the center of the end cover, and the center hole is disposed at the center of the base and connected to a drive shaft of the external rotor.

In certain classes of this embodiment, the housing further comprises multiple wind wheels and air inlets, the base is connected to the side wall via the wind wheels, and the air inlet is disposed between adjacent wind wheels.

In certain classes of this embodiment, an annular step is disposed at the center of the side wall, multiple protruding parts extend from the surface of the annular step, a magnetic conductive housing is disposed on the annular step, a groove is disposed on one end of the magnetic conductive housing, and the protruding parts are received in the groove.

In certain classes of this embodiment, the center hole and the base are integrally formed by injection molding.

In certain classes of this embodiment, the housing further comprises a metal rotating spline connected to the base, and the center hole is disposed in the metal rotating spline.

In certain classes of this embodiment, the housing further comprises a metal rotating spline disposed in the base, and the center hole is disposed in the metal rotating spline.

Advantages of the Housing Include the Following:

1) the wind wheels generate axial airflow and dissipate heat from a motor winding as the housing rotates in the forward direction or the reverse direction, and thus heat dissipation performance is improved; and
2) the housing acts as a buffer and is capable of reducing vibration in operation.

Advantages of the External Rotor Include the Following:

1) the injection molding-formed housing is light and cost-effective and features a simple production process;

2) the wind wheels generate axial airflow and dissipate heat from a motor winding as the housing rotates in the forward direction or the reverse direction, and thus heat dissipation performance is improved; and
3) the housing acts as a buffer and is capable of reducing vibration in operation.

BRIEF DESCRIPTION OF THE DRAWINGS

Detailed description will be given below with reference to accompanying drawings, in which.

DETAILED DESCRIPTION OF THE EMBODIMENTS

Figure 1:
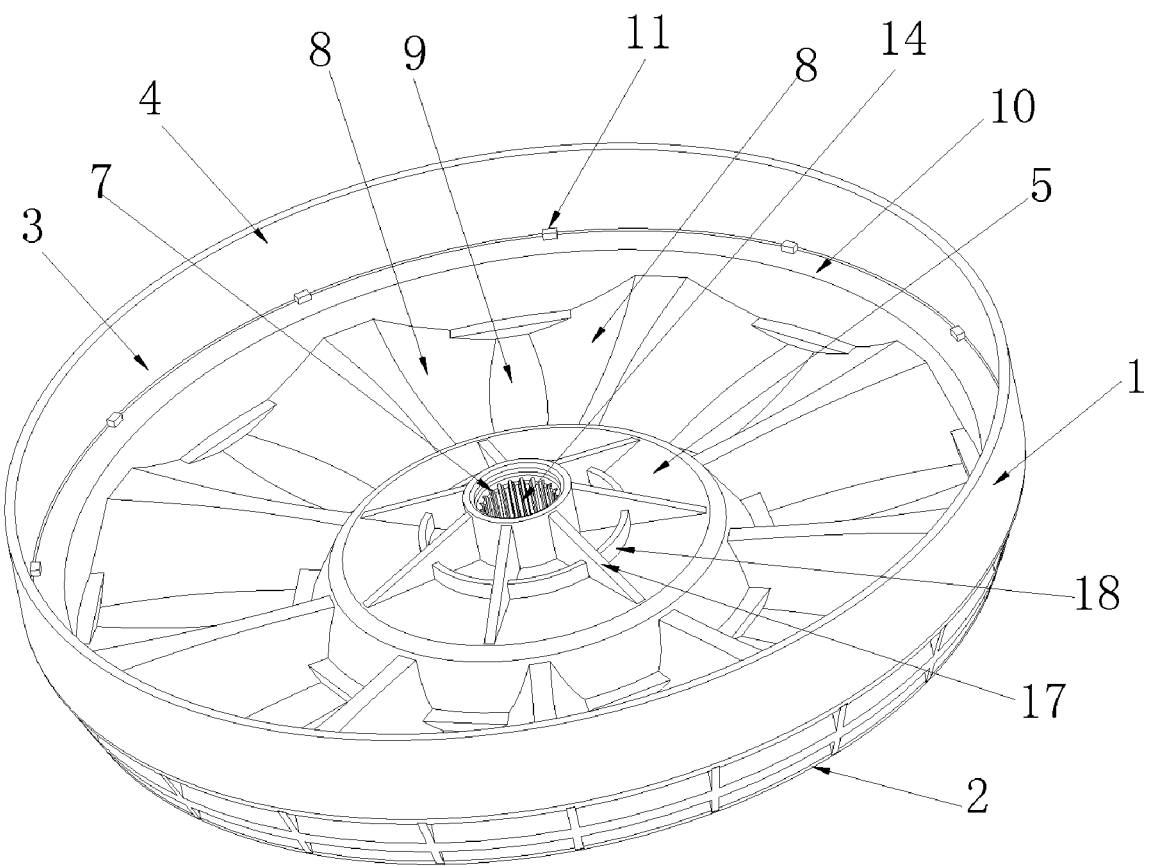
FIG. 1 is a front view of a housing according to an exemplary embodiment of the invention.
Figure 2:
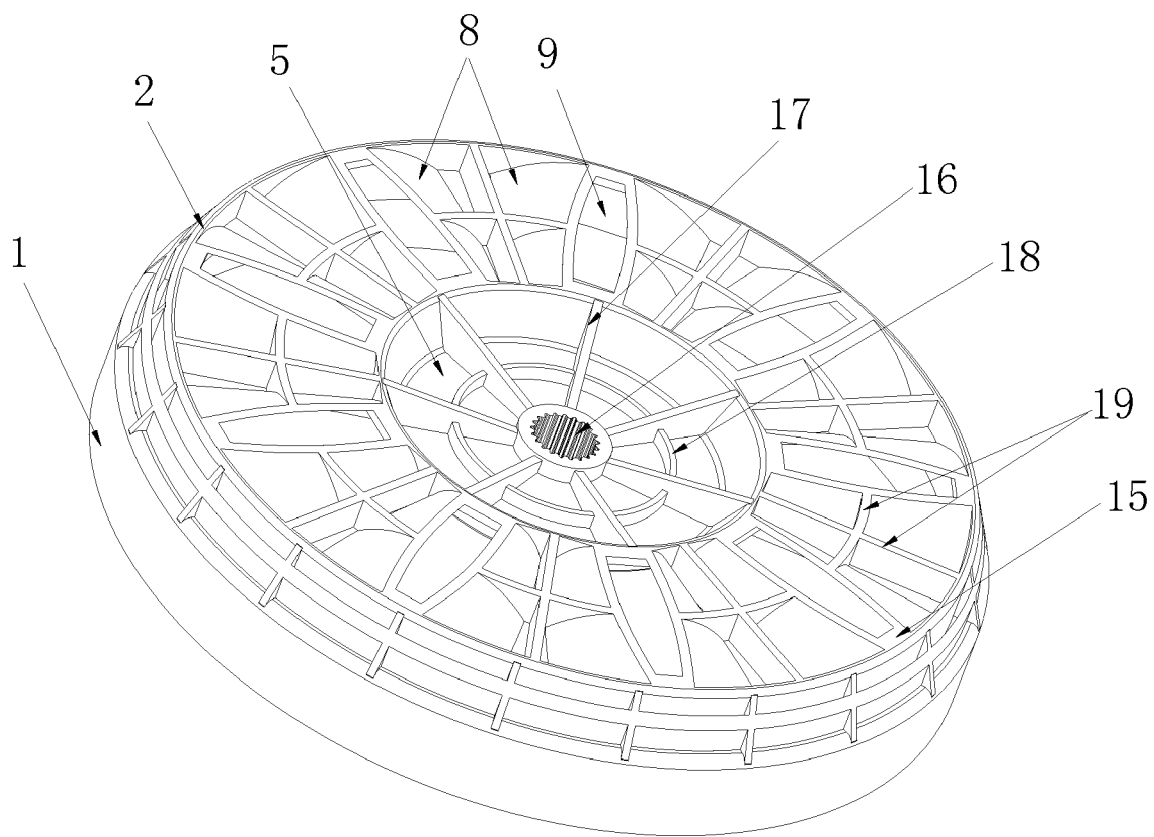
FIG. 2 is a back view thereof.
Figure 3:
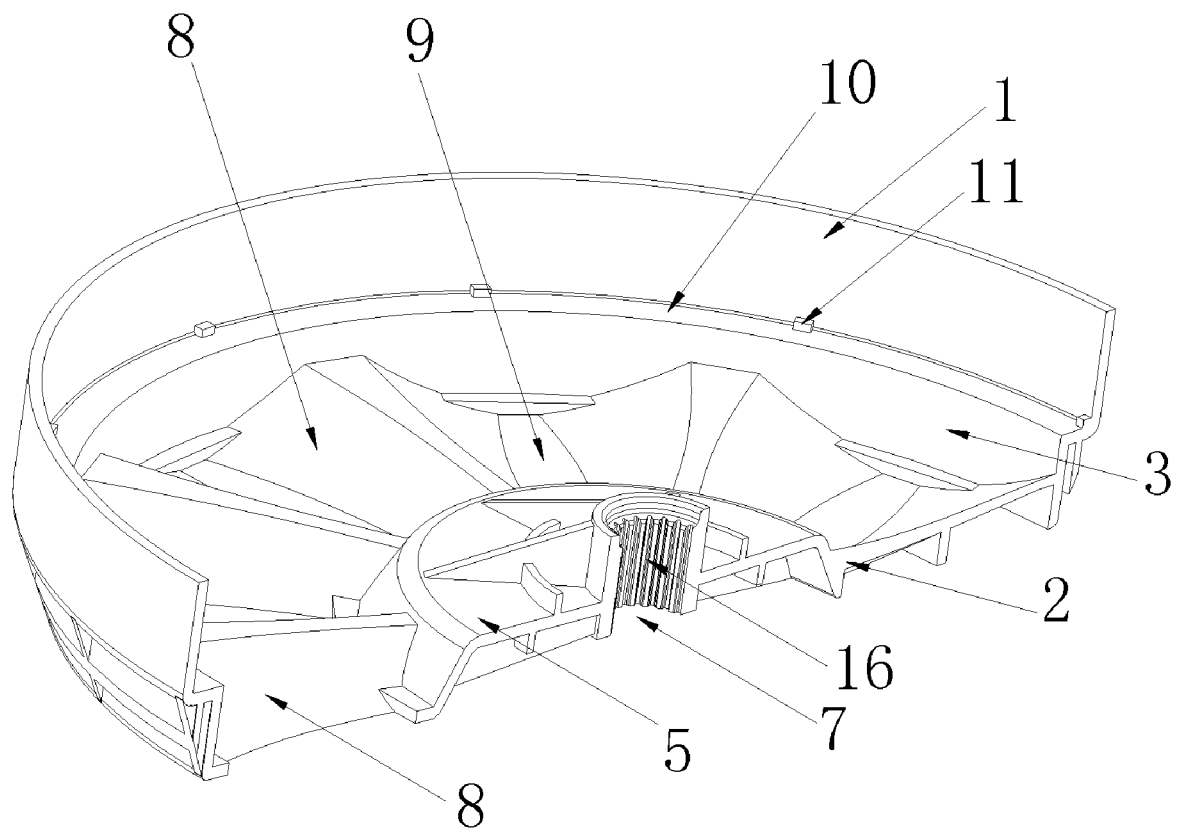
FIG. 3 is a perspective view of a cut through section of the housing according to an exemplary embodiment of the invention.
Figure 4:
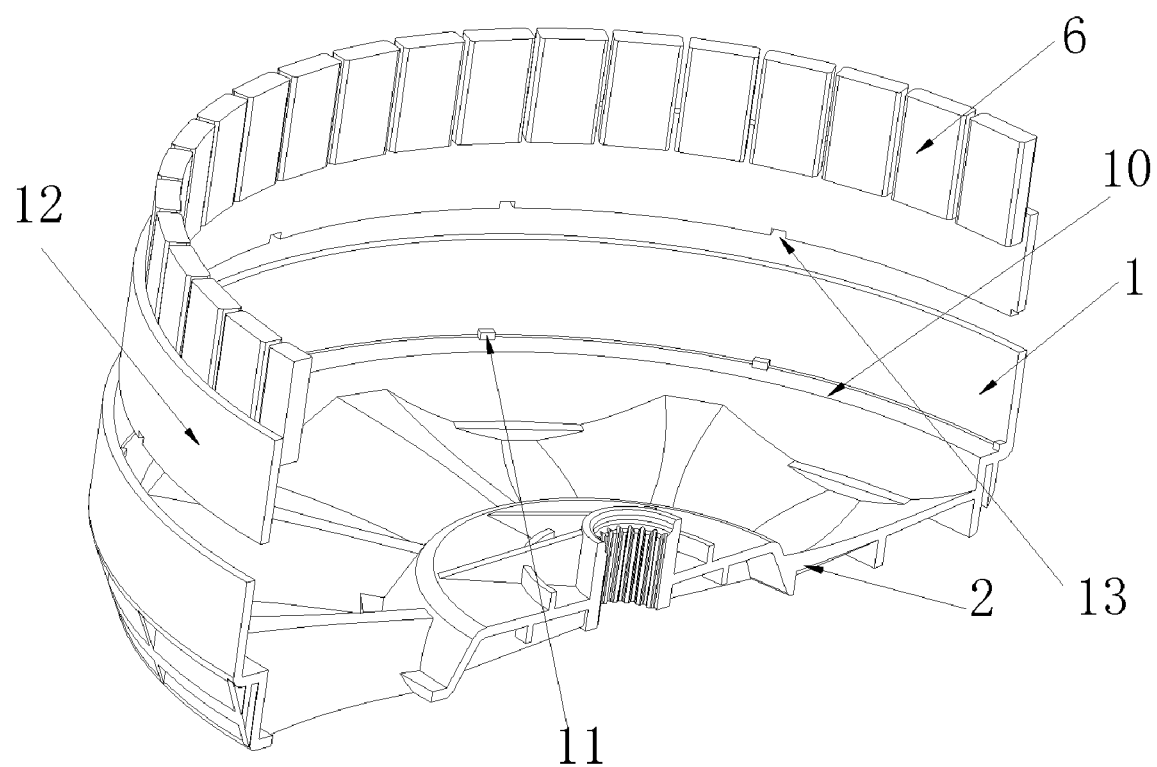
FIG. 4 is perspective view of a cut through section of the external rotor according to an exemplary embodiment of the invention.

As shown in FIGS. 1-4, housing for an external rotor of the invention comprises a side wall 1, an end cover 2, a cavity 3, an opening 4, a base 5, a center hole 7, multiple wind wheels 8, multiple air inlets 9, and a metal rotating spline 14. The end cover 2 is disposed at the bottom of the side wall 1. The cavity 3 is formed between the side wall 1 and the end cover 2. The opening 4 is disposed at the top of the housing. The base 5 is disposed at the center of the end cover 2 and connected to the side wall 1 via the wind wheels 8. The center hole 7 is disposed at the center of the base 5 and connected to a drive shaft of the external rotor, and the air inlet 9 is disposed between adjacent wind wheels 8.

The thickness of the wind wheel 8 reduces gradually from the center thereof, so that axial airflow is generated as the housing rotates forwardly or reversely. Each of the wind wheels 8 is in a shape of an inverted V. All the wind wheels 8 are distributed circumferentially, and the number thereof is between 2 and 60.

An annular step 10 is disposed at the center of the side wall 1, multiple protruding parts 11 extend from the surface of the annular step 10, a magnetic conductive housing 12 is disposed on the annular step 10, a groove 13 is disposed on one end of the magnetic conductive housing 12, and the protruding parts 11 are received in the groove 13.

The metal rotating spline 14 is connected to the base 5, and the center hole 7 is disposed in the metal rotating spline 14. The metal rotating spline 14 comprises multiple teeth 16, the teeth are arc-shaped, rectangular, triangular, involute, ladder-shaped, or sawtooth-shaped, and the number of the teeth 16 is between 2 and 60. In other embodiments, the metal rotating spline 14 may be omitted or disposed in the base 5. When the metal rotating spline 14 is omitted, the center hole 7 and the base 5 are integrally formed by injection molding.

The side wall 1, the wind wheel 8, and the base 5 are integrally formed by injection molding.

Multiple cross-shaped supporting ribs 19 are disposed at the bottom of the wind wheel 8, and the wind wheels 8 are connected to each other via multiple supporting ribs 15. Multiple axial supporting ribs 17 and annular supporting ribs 18 connected with each other are disposed at the top and the bottom of the base 5.

Multiple magnetic tiles 6 are disposed on the inner wall of the magnetic conductive housing 12.

Figure 5:
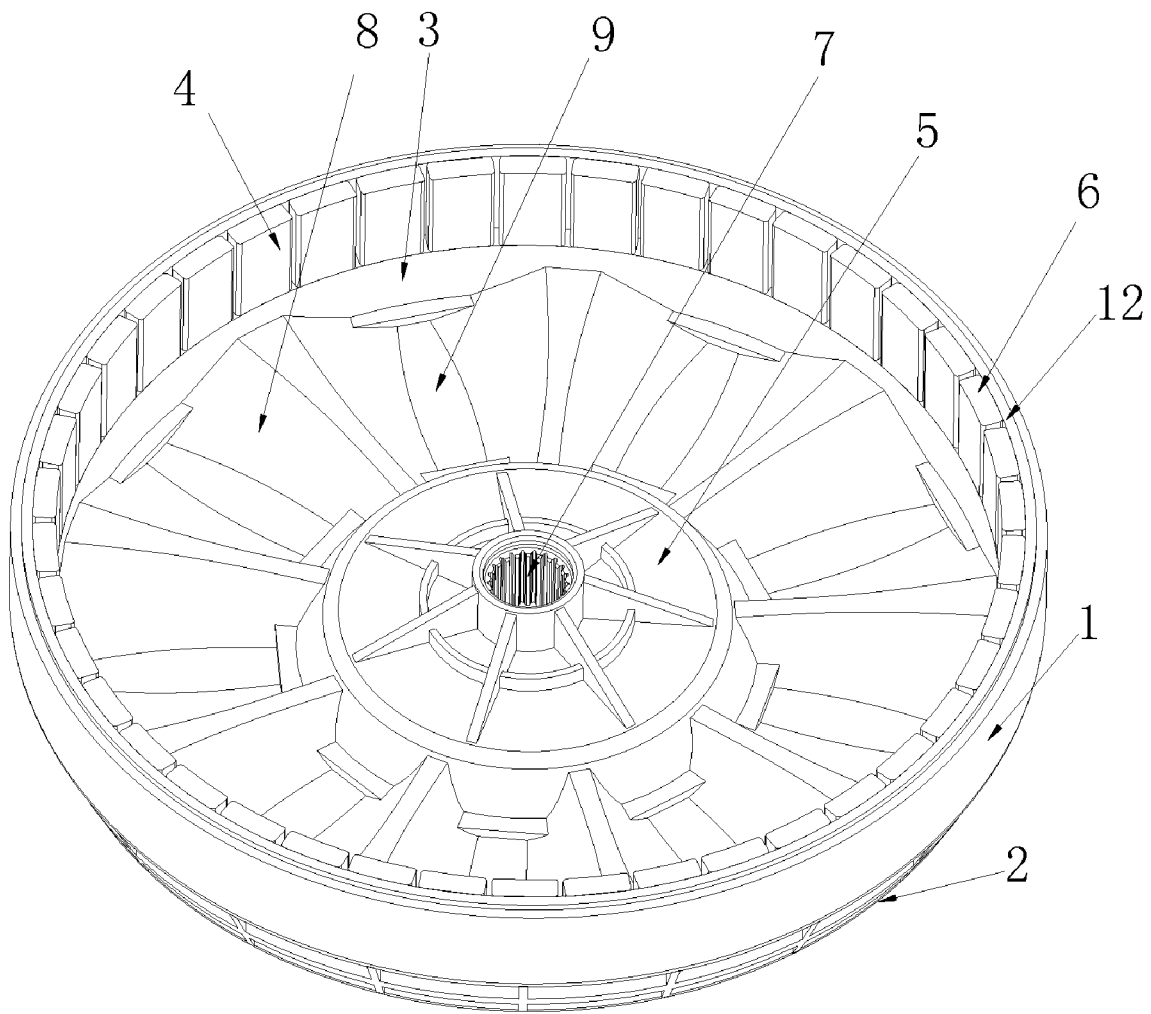
FIG. 5 is a perspective view of the external rotor of another exemplary embodiment of the invention.

As shown in FIGS. 1-5, the external rotor of the invention comprises a magnetic conductive housing 12, a magnetic tile 6, and a housing, comprising a side wall 1, an end cover 2, a cavity 3, a base 5 and a center hole 7, wherein the magnetic tile 6 is disposed on the magnetic conductive housing 12, the end cover 2 is disposed at the bottom of the side wall 1, the cavity 3 is formed between the side wall 1 and the end cover 2, the base 5 is disposed at the center of the end cover 2, and the center hole 7 is disposed at the center of the base 5 and connected to a drive shaft of the external rotor.

The end cover 2 is disposed at the bottom of the side wall 1. The cavity 3 is formed between the side wall 1 and the end cover 2. The opening 4 is disposed at the top of the housing. The base 5 is disposed at the center of the end cover 2 and connected to the side wall 1 via the wind wheels 8. The center hole 7 is disposed at the center of the base 5 and connected to a drive shaft of the external rotor, and the air inlet 9 is disposed between adjacent wind wheels 8.

The thickness of the wind wheel 8 reduces gradually from the center thereof, so that axial airflow is generated as the housing rotates forwardly or reversely. Each of the wind wheels 8 is in a shape of an inverted V. All the wind wheels 8 are distributed circumferentially, and the number of the wind wheels is between 2 and 60.

An annular step 10 is disposed at the center of the side wall 1, multiple protruding parts 11 extend from the surface of the annular step 10, a magnetic conductive housing 12 is disposed on the annular step 10, a groove 13 is disposed on one end of the magnetic conductive housing 12, and the protruding parts 11 are received in the groove 13.

The metal rotating spline 14 is connected to the base 5, and the center hole 7 is disposed in the metal rotating spline 14. The metal rotating spline 14 comprises multiple teeth 16, the teeth are arc-shaped, rectangular, triangular, involute, ladder-shaped, or sawtooth-shaped, and the number of the teeth 16 is between 2 and 60. In other embodiments, the metal rotating spline 14 may be omitted or disposed in the base 5. When the metal rotating spline 14 is omitted, the center hole 7 and the base 5 are integrally formed by injection molding.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A housing for an external rotor, comprising: a side wall (1); an end cover (2) directly connected to said side wall (1); a cavity (3) formed between said side wall (1) and said end cover (2); a plurality of wind wheels (8); a plurality of air inlets (9), each of said air inlets (9) disposed one between adjacent wind wheels (8); a base (5) disposed at the center of said end cover (2) and connected to said side wall (1) via said wind wheels (8); and a center hole (7) disposed at the center of said base (5), said center hole (7) for forming connection to a drive shaft of the external rotor; wherein said side wall (1), said wind wheel (8), and said base (5) are integrally formed by injection molding; a plurality of cross-shaped supporting ribs (19) is disposed at the bottom of said wind wheel (8); and said wind wheels (8) are connected to each other via a plurality of supporting ribs (15).

2. The housing of claim 1, wherein the thickness of said wind wheel (8) reduces gradually from the center thereof, whereby generating axial airflow as the rotor rotates forwardly or reversely.

3. The housing of claim 1, wherein
an annular step (10) is disposed at the center of said side wall (1);
multiple protruding parts (11) extend from the surface of said annular step (10);
a magnetic conductive housing (12) is disposed on said annular step (10);
a groove (13) is disposed on one end of said magnetic conductive housing (12); and
said protruding parts (11) are received in said groove (13).

4. The housing of claim 1, wherein said center hole (7) and said base (5) are integrally formed by injection molding.

5. The housing of claim 1, further comprising a metal rotating spline (14) connected to said base (5).

6. The housing of claim 5, wherein
said center hole (7) is disposed in said metal rotating spline (14);
said metal rotating spline (14) comprises multiple teeth (16);
said teeth are arc-shaped, rectangular, triangular, involute, ladder-shaped, or sawtooth-shaped; and
the number of said teeth (16) is between 2 and 60.

7. The housing of claim 1, further comprising a metal rotating spline (14) disposed in said base (5).

8. The housing of claim 7, wherein
said center hole (7) is disposed in said metal rotating spline (14);
said metal rotating spline (14) comprises multiple teeth (16);
said teeth are arc-shaped, rectangular, triangular, involute, ladder-shaped or sawtooth-shaped; and
the number of said teeth (16) is between 2 and 60.

9. The housing of claim 1, wherein each of said wind wheels (8) is in the shape of an inverted V.

10. The housing of claim 1, wherein said wind wheels (8) are distributed circumferentially, and the number of said wind wheels (8) is between 2 and 60.

11. The housing of claim 1, wherein multiple axial supporting ribs (17) and annular supporting ribs (18) connected with one other are disposed at the top and the bottom of said base (5).

12. An external rotor, comprising a magnetic conductive housing (12); a plurality of magnetic tiles (6) disposed at the inner wall of said magnetic conductive housing (12); and a housing comprising: a side wall (1); an end cover (2) directly connected to said side wall (1); a cavity (3) formed between said side wall (1) and said end cover (2); a base (5) disposed at the center of said end cover (2); a plurality wind wheels (8); a plurality of air inlets (9), each of said air inlets (9) disposed one between adjacent wind wheels (8); and a center hole (7) disposed at the center of said base (5), said center hole (7) for forming connection to a drive shaft of the external rotor, wherein said side wall (1), said wind wheel (8), and said base (5) are integrally formed by injection molding; a plurality of cross-shaped supporting ribs (19) is disposed at the bottom of said wind wheel (8); and said wind wheels (8) are connected to each other via a plurality of supporting ribs (15).

13. The external rotor of claim 12, wherein
an annular step (10) is disposed at the center of said side wall (1);
multiple protruding parts (11) extend from the surface of said annular step (10);
said magnetic conductive housing (12) is disposed on said annular step (10);
a groove (13) is disposed on one end of said magnetic conductive housing (12); and
said protruding parts (11) are received in said groove (13).

14. The external rotor of claim 12, wherein said center hole (7) and said base (5) are integrally formed by injection molding.

15. The external rotor of claim 12 comprising further a metal rotating spline (14) connected to said base (5), wherein said center hole (7) is disposed in said metal rotating spline (14).

16. The external rotor of claim 12, wherein
said housing further comprises a metal rotating spline (14) disposed in said base (5); and
said center hole (7) is disposed in said metal rotating spline (14).

* * * * *